(12) United States Patent
Brisson et al.

(10) Patent No.: US 7,242,780 B2
(45) Date of Patent: Jul. 10, 2007

(54) AUDIO SIGNAL CABLE WITH PASSIVE NETWORK

(76) Inventors: Bruce Brisson, 4130 Citrus Ave., Suite #9, Rocklin, CA (US) 95677; Timothy Andrew Brisson, 229 Walker St., Gardnerville, NV (US) 89410

(*) Notice: Subject to any disclaimer, the term of this patent is extended or adjusted under 35 U.S.C. 154(b) by 270 days.

(21) Appl. No.: 10/675,582

(22) Filed: Sep. 30, 2003

(65) Prior Publication Data
US 2004/0202334 A1    Oct. 14, 2004

Related U.S. Application Data

(62) Division of application No. 09/014,329, filed on Jan. 27, 1998, now Pat. No. 6,658,119.

(51) Int. Cl.
*H04B 3/00* (2006.01)

(52) U.S. Cl. .................. 381/77; 381/94.1; 330/149; 333/24 C

(58) Field of Classification Search .......... 381/94.1, 381/120, 77, 94.6, 97; 330/149, 53; 333/167, 333/172, 24 C
See application file for complete search history.

(56) References Cited

U.S. PATENT DOCUMENTS 4,954,787 A * 9/1990 Brisson .................. 381/120
6,658,119 B1 * 12/2003 Brisson et al. ............ 381/77

* cited by examiner

*Primary Examiner*—Ping Lee
(74) *Attorney, Agent, or Firm*—Jill Robinson

(57) ABSTRACT

A network for altering the audio output of a system which comprises at least one series RC or RLC circuit coupled between the positive and ground conductor of a cable that is suitable for connecting an electrical musical instrument, or similar source, to an amplifier or other load. The components of the RC or RLC circuit are selected by determining the frequency at which the positive conductor's natural phase angle is 45°. Each of the RC or RLC circuits is selected to have a phase angle of −45° at a frequency equal to or different from the frequency at which the positive conductor has a phase angle of 45° depending upon the audio effect desired. In addition, the component values of the circuits are selected such that the measured impedance of the network at all frequencies in a predetermined frequency range is equal to or greater than 0.20 MΩ, and the overall combined capacitance of the cable and the capacitance and/or inductance of the network does not cause the effect of audible "roll-off" in the system.

14 Claims, 2 Drawing Sheets

AUDIO SIGNAL CABLE WITH PASSIVE NETWORK

RELATED APPLICATION

This application is a divisional of U.S. patent application Ser. No. 09/014,329, filed Jan. 27, 1998, now U.S. Pat. No. 6,658,119, which is incorporated herein by reference.

BACKGROUND OF THE INVENTION

The present invention relates to audio cables in general and in particular to a method and apparatus comprising a passive network particularly suitable for use in cables designed to connect electrical musical instruments to amplifiers.

Musicians of electrical instruments have long been aware that the audio qualities of their music depend in part on the total system comprising the instrument, the cable and the amplifier. Generally, within the range of audio frequencies produced by a particular electrical instrument, cable and amplifier system, there is a smaller range in which the sounds produced are "emphasized" or "noisy." The actual range depends on the length, materials and construction of the cable.

Graphic equalizers, which utilize active filters, may be used to compensate for this effect. Usually the compensation requires an amplification of the sounds at the lower and higher end of the relevant frequency range, with a gradual decrease in the amplification for each frequency range toward the center frequency which produces the familiar "V" on the graphic equalizer controls. Active filter compensation, however, can produce its own noise. Furthermore, a more evenly balanced signal expands the control choices afforded to the musician by a graphic equalizer. Because of the required compensation, such choices are usually limited in current standard systems.

The inventors of the present invention discovered that there was a relationship between the rate of change in the phase angle of the cable and the perceived clarity and "evenness" of the music produced by the system. Where the rate of change in the phase angle was at a maximum the sound produced was the most "emphasized" or "noisy." The relationship could be quantified in terms of the frequency at which the positive conductor of the cable had a phase angle of 45° (or, alternatively, as the frequency where the quality factor (Q) was equal to 1) as a result of the inherent inductance of the cable.

The inventors discovered that by selectively connecting passive RC or RLC circuits between the positive and negative (or ground) conductors of the cable, where the RC or RLC circuits had a phase angle of −45° at selected frequencies that were within the audio frequency range, approximately equally distributed on a logarithmic scale, and not equal to the frequency where the cable naturally had a phase angle of 45°, the resulting audio output could be modified to significantly reduce the "emphasized" or "noisy" effect, and produce a more uniform audio output over the range of frequencies produced by the system.

SUMMARY OF THE INVENTION

In view of the foregoing, principal object of the present invention is a method and apparatus comprising a passive network which can be incorporated into a coaxial or any other type of cable used to connect electrical musical instruments to amplifiers, that modifies the overall audio effect produced by the system comprising the instrument or source of the audio signal, the cable and the amplifier.

In one embodiment of the present invention, the network comprises a plurality of RC circuits coupled in parallel, connected between the positive conductor and ground of a cable suitable for connecting an electrical musical instrument to an amplifier. There is a frequency at which the positive conductor's natural phase angle, produced as a result of inherent inductance, is 45°. Each of the circuits is selected to have a phase angle of −45° at a different frequency, which frequency is in the audio frequency range between approximately 20 Hz and 4 kHz and above and/or below the frequency at which the cable has a phase angle of 45°. The particular frequencies selected depend upon the range of audible frequencies produced by the instrument or other source of audio signal and the desired effect(s). The component values of the circuits are selected such that the measured impedance of the network at all frequencies in the relevant frequency range (i.e., the audible frequencies for the system) is equal to or greater than 0.20 MΩ and the overall combined capacitance of the cable and network is such that the "roll-off" in the relevant frequency range is not large enough to have an audible effect, which generally means that the capacitance of the circuits must be very low.

In some alternative embodiments, the plurality of circuits comprise RLC circuits where the components are selected using similar criteria. In other embodiments the network can be designed to emphasize certain frequencies.

Other objectives of the present invention will become readily apparent to those skilled in this art form from the following description and the drawings.

BRIEF DESCRIPTION OF THE DRAWINGS

The above and other objects, features and advantages of the present invention will become apparent from the following detailed description of the accompanying drawings, in which.

DETAILED DESCRIPTION OF THE DRAWINGS

The method and apparatus of the present invention comprise a passive network that when placed in parallel across the positive and ground conductors of a cable used to transmit electrical signals, modifies the "emphasis" and general audio effect produced by the system of the cable, the source and the amplifier.

Figure 1:
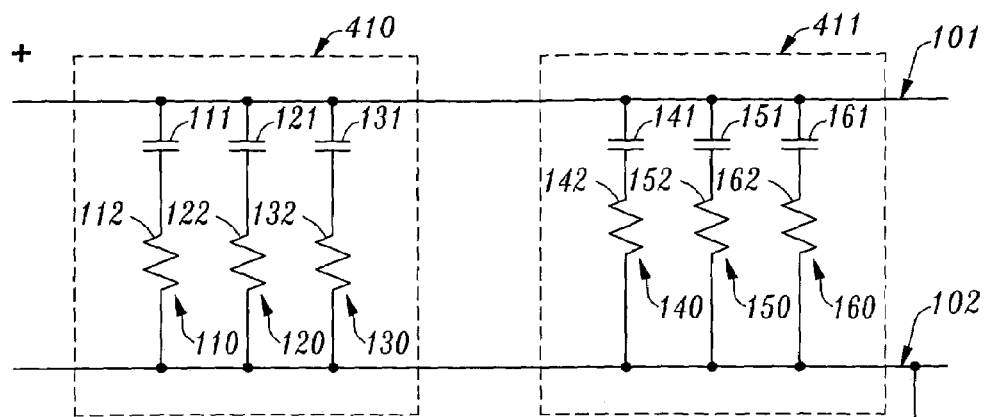
FIG. 1 is a schematic representation of a specific embodiment of a network according to the present invention utilizing RC circuits.

Reference is now made to FIG. 1 which shows a schematic representation of an embodiment of the current invention. A cable 100 suitable for use in transmitting an electrical signal for audio applications includes a positive conductor 101 and ground 102. As an example, the cable could be suitable for connecting an electrical musical instrument to an amplifier. In such an application, the cable would usually be coaxial; however, twisted pair or other suitable cable could also be used provided that the capacitance of the cable was not so great as to cause roll-off when combined with the added network. Network circuits 110, 120, 130, 140, 150, 160 each comprising a capacitive element 111, 121, 131, 141, 151, 161 and a resistive element 112, 122, 132, 142, 152, 162 connected in series, are connected in parallel with each other across the positive 101 conductor and ground 102, as shown. Although the embodiment shown has six network circuits, a greater or lesser number of such network circuits could be included, subject to the selection criteria described below and the audio effect(s) desired.

The specific values of the capacitive and resistive elements of the network circuits are selected as follows:

The capacitance of the cable, and the frequency at which the phase angle of the positive conductor is 45° as a result of inherent inductance (or, equivalently, the frequency at which the quality factor is 1), are determined. These values may be measured directly using techniques well-known in the art. For example, the phase angle of a 30 foot coaxial cable typically approaches 45° at a frequency between approximately 1 kHz and 5 kHz.

The phase angle of individual circuits at particular frequencies may be determined using the formula:

$$\varphi = \tan^{-1}\left(\frac{\omega L - 1/\omega C}{R}\right)$$

The quality factor in series capacitive and inductive circuits may be determined using the formulae:

$$Q_C = 1/2\pi fCR$$

$$Q_L = 2\pi fL/R$$

where f is the frequency, C is the capacitance, L is the inductance, R is the resistance and $\omega = 2\pi f$.

The maximum permitted added capacitance and an estimate of the maximum number of circuits in the added network is then determined by calculating when audible roll-off would occur, if the resistive and capacitive elements are such that the measured impedance of the network at all frequencies in the relevant frequency range is equal to or greater than .20 MΩ (usually with the resistive element in each RC or RLC circuit having a value equal to or greater than .20 MΩ). Thus, usually, the total combined capacitance of the cable and network must be less than about 2000 to 2500 pF in order to prevent an undesirably audible effect from roll-off.

As would be evident to those of ordinary skill in the art, cable capacitance is a function of the type of cable selected and increases with an increase in the cable length. For example, the measured capacitance in certain coaxial cables without a network was found to be as follows:

| Length | Capacitance |
|--------|-------------|
| 10' | 248 pF |
| 15' | 325 pF |
| 20' | 420 pF |
| 30' | 630 pF |

Thus, it may not be possible in certain long cables (particularly in a twisted pair cable which generally has a higher capacitance per foot than coaxial cable) to add any additional capacitive elements, such as those in the network circuits while maintaining resistor and capacitance values such that the measured impedance of the network at all frequencies in the relevant frequency range is equal to or greater than 0.20 MΩ, without causing an undesirably audible effect from roll-off within the audio frequency range or within that selected portion of the audio frequency range generally produced by the instrument or other source of signals.

After the estimated maximum added capacitance is determined, the desired −45° phase angle frequencies would then be selected, based upon the possible frequencies given the estimated number of network circuits that could reasonably be added without roll-off, and the desired effect. The frequencies would generally be (1) within the audio frequency range of the instrument or other signal source; (2) above and/or below the frequency at which the positive conductor of the cable has a phase angle of 45°; and (3) ideally, distributed at approximately equal intervals (measured on a logarithmic scale and including the 45° frequency of the positive inductor of the cable) between the lowest frequency and the highest frequency to achieve the audio effect of deemphasis and a uniformly "even" quality over the audio frequency range of the instrument or signal source. By way of example only, in a cable for use with a musical instrument, the lowest frequency would typically be the frequency of the lowest audible note, and the highest frequency would typically be five times the frequency of the highest note. Thus, for a guitar the values would be about 77 Hz and 3.5 KHz, while in a bass the values would be about 40 Hz and 1 KHz. In cables for general audio systems it might be appropriate to select the highest frequency at 20 KHz, at the upper boundary of the audio frequency range. In certain cases it may not be possible to achieve distribution at equal intervals using standard component values; in such cases, standard component values can be used but the selected frequencies may need to be adjusted "by ear" to achieve the desired correction. In addition, because of the standard component values available, as well as the usually tolerances in both component and cable values, the final selection of the appropriate component values and the appropriate frequencies must generally be done "by ear" and by direct measurement of prototypes.

It should be noted that some musicians may prefer an increased emphasis (or deemphasis) at certain frequencies, rather than a uniformly "even" quality, and the circuits may be selected to emphasize such frequencies, which may require that the selected frequencies fall outside of audio frequency range or outside of the frequency range of the signal source. The frequencies may also be selected to be at or near the natural 45° phase angle frequency of the positive conductor of the cable. For example, certain musicians may wish to emphasize the lower and/or higher ranges in their music and/or increase the natural emphasis at certain frequencies including those frequencies naturally emphasized by the cable. In such cases the −45° frequencies of the circuits would be selected to be at or close to the 45° frequency of the positive conductor of the cable and/or concentrated at the lower or higher ends of the relevant frequency range.

As an example of a network that creates a uniformly "even" effect, for a 10 to 25 foot coaxial cable, the following approximate frequency and component values were found to correct the emphasis created when the cable alone is used in an electrical guitar system:

| Desired −45° Phase Angle Frequency | Resistive Element Value | | Capacitive Element Value | | Calculated Phase Angle |
|---|---|---|---|---|---|
| 3.5 kHz | 111 | 220 KΩ | 112 | 220 pF | −43.2° |
| 320 Hz | 121 | 5 MΩ | 122 | 100 pF | −44.8° |
| 160 Hz | 131 | 10 MΩ | 132 | 100 pF | −44.8° |
| 30 Hz | 141 | 5 MΩ | 142 | 1000 pF | −46.7° |
| 1.2 kHz | 151 | 1 MΩ | 152 | 100 pF | −53.0° |
| 60 Hz | 161 | 10 MΩ | 162 | 220 pF | −50.3° |

Similarly, the following approximate frequency and component values were found to correct the emphasis created when a 10 to 30 foot coaxial cable is used alone in an electrical bass system:

| Desired 45° Phase Angle Frequency | Resistive Element Value | | Capacitive Element Value | | Calculated Phase Angle |
|---|---|---|---|---|---|
| 50 Hz | 111 | 10 MΩ | 112 | 300 pF | −45.3° |
| 700 Hz | 121 | 2 MΩ | 122 | 100 pF | −48.7° |
| 30 Hz | 131 | 5 MΩ | 132 | 1000 pF | −46.7° |
| 160 Hz | 141 | 10 MΩ | 142 | 100 pF | −44.8° |
| 60 Hz | 151 | 10 MΩ | 152 | 220 pF | −50.3° |
| 320 Hz | 161 | 5 MΩ | 162 | 100 pF | −44.8° |

As is evident from review of the Calculated Phase Angle column of the tables above, the circuit the calculated phase angle of a specific network at the selected frequency may vary from the desired −45° by about 8 degrees; although the calculated phase angles generally remain within 3 degrees of −45°.

Figure 2:
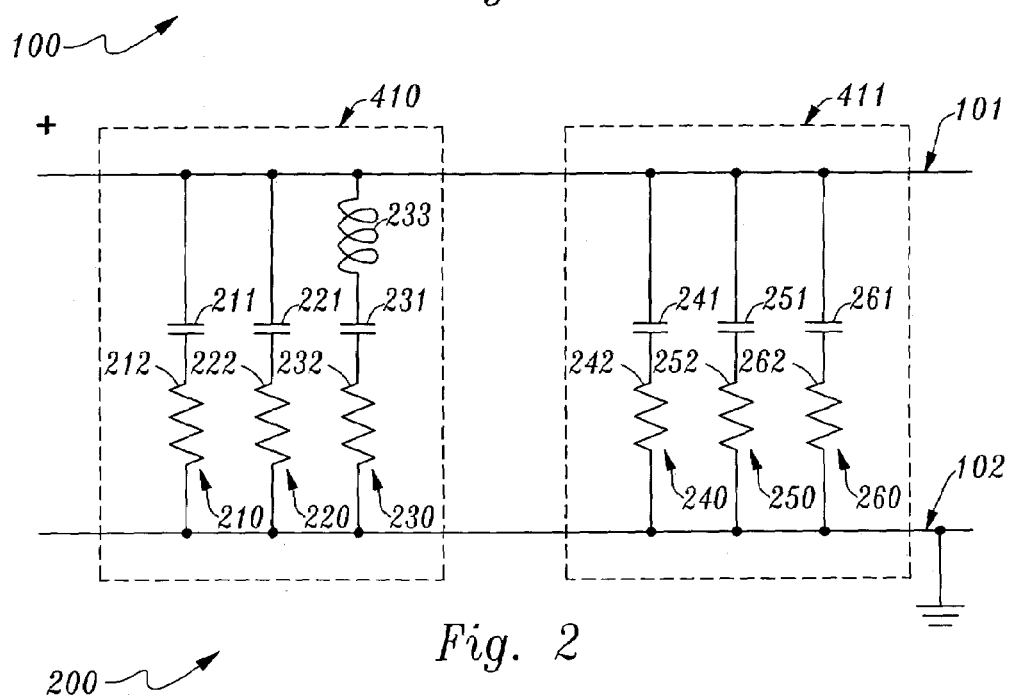
FIG. 2 is a schematic representation of an alternative embodiment of a network according to the present invention utilizing an RLC circuit.

Reference is now made to FIG. 2 which shows a schematic representation of an embodiment of the current invention that utilizes an RLC circuit to replace one of the RC circuits. As in FIG. 1, a cable 200 suitable for use in transmitting an electrical signal for audio applications includes a positive conductor 101 and ground 102. Network circuits 210, 220, 230, 240, 250, 260, each comprising a capacitive element 211, 221, 231, 241, 251, 261 and a resistive element 212, 222, 232, 242, 252, 262. In addition, network circuit 230, associated with a −45° frequency of 160 Hz, includes an inductive element 233. The elements of each circuit are connected in series as shown, and the circuits are connected in parallel across the positive conductor 101 and ground 102 of the cable. Of course, it would be possible to replace more than one of the RC circuits with an RLC circuit. The specific values of the desired −45° frequencies and the components are selected in an analogous manner to the selection process used for the RC circuits. As with the RC circuits, the values of the inductive, resistive and capacitive elements of the circuits are selected such that each circuit has a phase angle of approximately −45° at selected frequencies as described in the text associated with FIG. 1, the resistive elements have a resistance of at least 0.20 MΩ, and the resistor, inductor and capacitance values are such that the measured impedance of the network at all frequencies in the relevant frequency range is equal to or greater than 0.20 MΩ. Additionally, the selection of the components is constrained by the audible effect of roll-off.

In an electrical guitar system, the following approximate frequency and component values were found to correct the emphasis created when a 10–25 foot cable is used alone:

| Desired 45° Phase Angle Frequency | Resistive Element Value | | Capacitive Element Value | | Inductive Element Value | | Calculated Phase Angle |
|---|---|---|---|---|---|---|---|
| 3.5 kHz | 211 | 220 KΩ | 212 | 220 pF | — | — | −43.2° |
| 320 Hz | 221 | 5 MΩ | 222 | 100 pF | — | — | −44.8° |
| 100 Hz | 231 | 15 MΩ | 232 | 100 pF | 233 | 560 μH | −43.2° |
| 30 Hz | 241 | 5 MΩ | 242 | 1000 pF | — | — | −46.7° |
| 1.2 kHz | 251 | 1 MΩ | 252 | 100 pF | — | — | −53.0° |
| 60 Hz | 261 | 10 MΩ | 262 | 220 pF | — | — | −50.3° |

Figure 3:
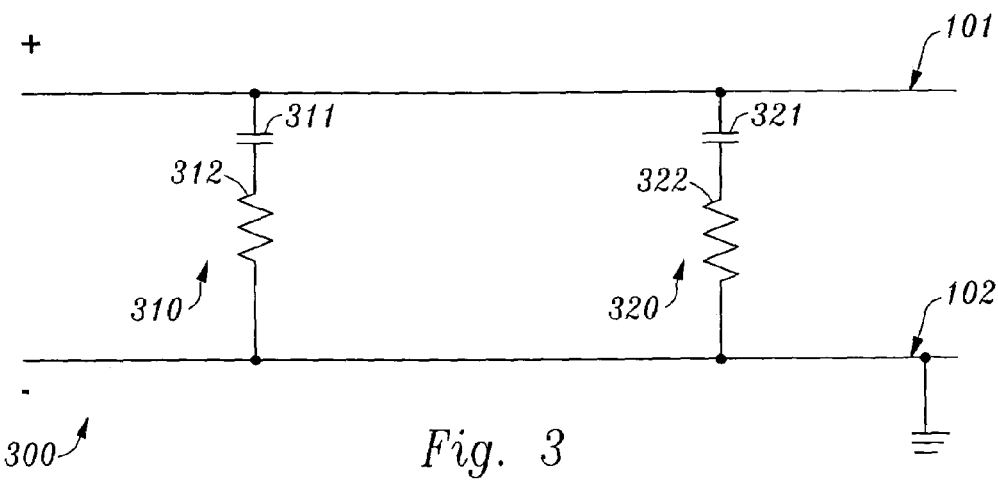
FIG. 3 shows an embodiment of the network according to the present invention designed to emphasize the higher and lower frequencies.

FIG. 3 shows a schematic representation of an embodiment of the current invention suitable for "emphasis" of the higher and lower frequencies. Essentially, by using only the RC circuits associated with 30 Hz and 1.2 kHz, the lower and higher audio values are emphasized. Thus, the embodiment includes a cable 300 suitable for use in transmitting an electrical signal for audio applications includes a positive conductor 101 and ground 102. Network circuits 310, 320 comprise capacitive elements 311, 321 having values of 100 pF and 1000 pF, respectively, and resistive elements 312, 322 having values of 1 MΩ and 5 MΩ, respectively, connected in series, as shown. The network circuits 310, 320 are then connected in parallel across the positive conductor 101 and ground 102 of the cable.

Figure 4:
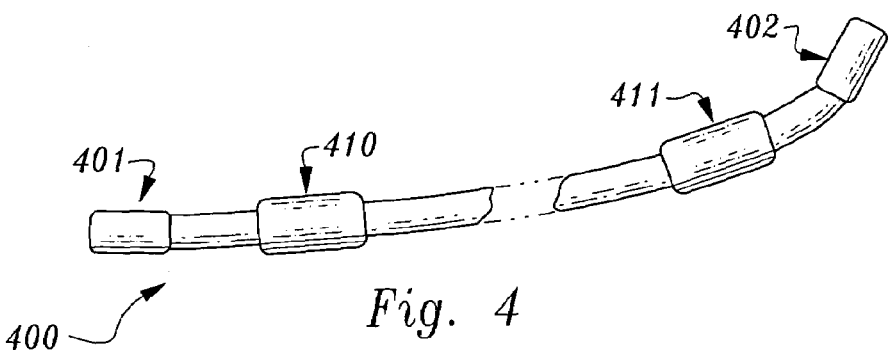
FIG. 4 shows an embodiment of an audio cable incorporating the present invention wherein the network is incorporated into the cable in electrical packages.

FIG. 4 shows a cable suitable for use in connecting an electrical instrument or similar source of audio signals to an amplifier or similar device. The cable 400 includes connectors 401, 402 that include positive and ground terminals (not shown) for connecting to the output terminals of the electrical instrument and the input terminals of the amplifier, respectively. The cable also includes two electrical packages 410, 411, one positioned near each of the two connectors 401, 402; however, the electrical packages could be positioned anywhere along the cable. Such electrical packages are designed to protect and shield the network components and can be constructed of any suitable insulating material, such as ABS plastic. The electrical packages are represented schematically in FIGS. 1 and 2, and in the embodiment shown each contains the components of three of the RC (or RLC) circuits.

Alternative packaging of the network circuits is, of course, possible: for example, it might be advantageous in certain applications to use one electrical package for all the RC, or RLC network circuits. In addition, the present invention is not necessarily limited to cables for electrical musical instruments and may have application in any cable used to transmit a electrical signal that is used to produce sound within the musical frequency range, for example, in theatrical amplification systems or in conventional stereo audio systems. Indeed, the embodiment of the networks shown for the bass have been used successfully in cables designed to connect amplifiers to speakers, significantly improving the audio quality of the system. Also, although the disclosure has referred to connecting the network between the positive conductor and ground, the network could, alternatively, be connected between positive and negative conductors depending upon the structure of the cable and the audio system.

Furthermore, in musical instrument systems and in stereo or similar audio systems, rather than being permanently incorporated into the cable, the networks may be contained in packages, separable from the cable, that are designed to be connected between one end of the cable and the source or load. Another possible embodiment, particularly useful for home or professional audio systems, places the networks in a package that may be incorporated into a wall unit, or otherwise, such that the package connects two cables.

Figure 5:
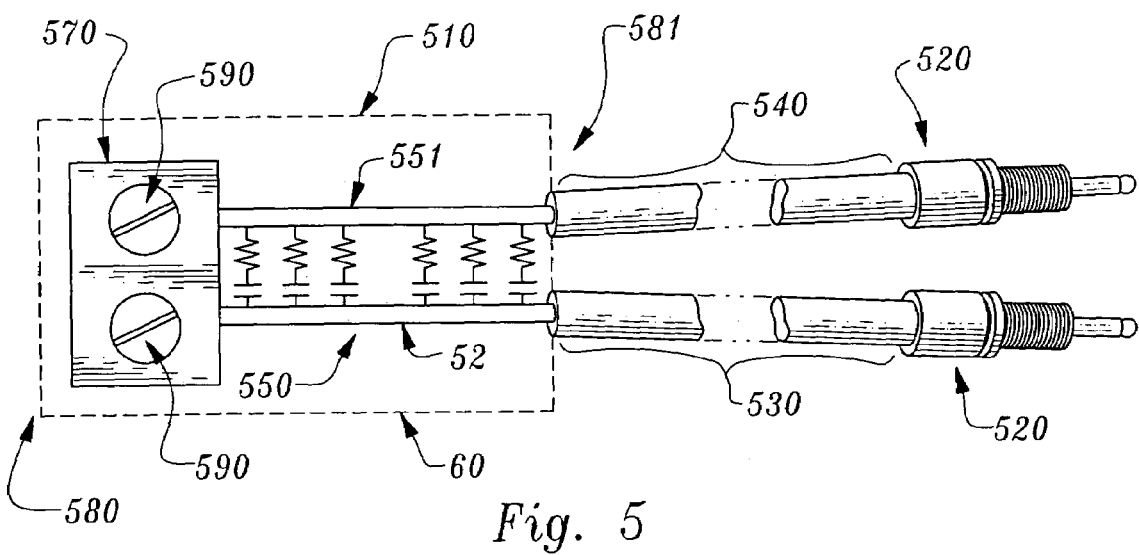
FIG. 5 shows an embodiment of the present invention wherein the network is incorporated into a removable connector package.

FIG. 5 shows an embodiment of the current invention in a separable package for use in an audio system. The network 550 is placed in a package 510 constructed of suitable insulating material. A suitable cable (not shown) can be inserted into an opening (not shown) in the package 510, at proximal end 580 of the package and held in the standard terminal block 570 by screws 590 such that the positive and negative conductors of the cable are held in mechanical and electrical connection with the positive and negative conductors 551, 552, between which the RC circuits of the network are connected. The proximal ends of each of the positive and negative conductors 530, 540 are electrically connected to conductors 551, 552 and extend from the package at distal end 581. The distal ends of the positive and negative conductors 530, 540 are held in mechanical and electrical attachment to connectors 520, which may be the universal connectors shown in U.S. patent application Ser. No. 08/640,084, now U.S. Pat. No. 5,791,919, or any other suitable connector.

Figure 6:
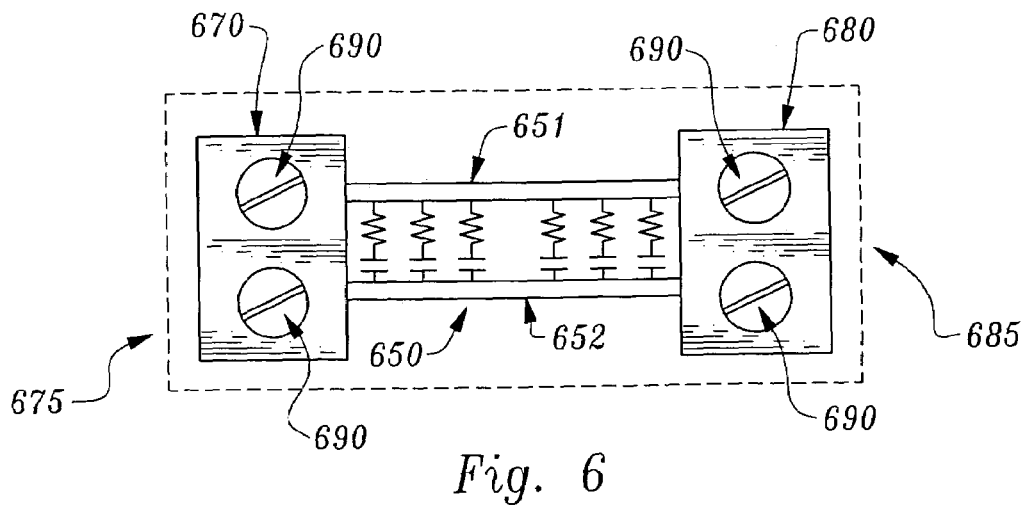
FIG. 6 shows an embodiment of the present invention wherein the network is incorporated into a package suitable for placement in a wall or similar structure.

FIG. 6 shows an embodiment of the current invention in a separable package that could be used as a wall unit or otherwise to connect two cables. The network 650 is placed in a package 610 constructed of suitable insulating material. A suitable cable (not shown) can be inserted into an opening (not shown) in the package 610, at proximal end 675 of the package and held in the standard terminal block 670 by screws 690 such that the positive and negative conductors of the cable are held in mechanical and electrical connection with the proximal ends of positive and negative conductors 651, 652, between which the RC circuits of the network are connected. A second cable (not shown) can be inserted into an opening (not shown) in the package 610, at distal end 685, and held in the standard terminal block 680 by screws 690 such that the positive and negative conductors of the cable are held in mechanical and electrical connection with the distal ends of positive and negative conductors 651, 652.

While preferred embodiments of the present invention are described above, it is contemplated that numerous modifications may be made thereto for particular applications without departing from the spirit and scope of the present invention. For example, the network described in the present invention might be incorporated into the output source of the electrical signal (such as an electrical guitar) into which the cable connects and/or the input of the amplifier into which the cable connects. In addition, if the cable connector includes both positive and negative (or ground) terminals (for example, an RCA plug), it might be possible to incorporate the network or networks into the body of the plug itself. Accordingly, it is intended that the embodiments described be considered only as illustrative of the present invention and that the scope thereof should not be limited thereto but be determined by reference to the claims hereinafter provided.

What is claimed is:

1. A cable suitable for electrically connecting a source for generating signals in the audio frequency spectrum and a load, the source having an output connector comprising a first and second output terminal and the load having an input connector comprising a first and second input terminal, said cable comprising:
   a first conductor having a first end and a second end, and having an input terminal near said first end suitable for electrically connecting to the first output terminal of the source, and having an output terminal near the second end, suitable for electrically connecting to the first input terminal of the load;
   a second conductor having a first end and a second end, and having an input terminal near said fist end suitable for electrical connecting to the second output terminal of the source, and having an output terminal near said second end suitable for electrically connecting to the second input terminal of the load;
   an input connector electrically coupled to the input terminals of the first and second conductor, suitable for effecting an electrical connection between the input terminal of the first conductor and the first output terminal of the source and between the input terminal of the second conductor and the second output terminal of the source;
   an output connector electrically coupled to the output terminals of the first and second conductor, suitable for effecting an electrical connection between the output terminal of the first conductor and the first input terminal of the load and between the output terminal of the second conductor and the second input terminal of the load,
   a network comprising:
      a circuit, said circuit comprising a resistive element electrically coupled in series with a capacitive element,
   said capacitive element and resistive elements having values such that the phase angle of the circuit is approximately −45 degrees at a selected frequency within the audio frequency range and such that the measured impedance of the network at all frequencies in a predetermined frequency range is equal to or greater than 0.20 MΩ,
   wherein said circuit is electrically coupled between the first conductor and the second conductor.

2. The cable of claim 1, wherein the fist conductor has a phase angle of 45 degrees at a known approximate frequency, and the selected frequency of the circuit is not equal to the known approximate frequency.

3. The cable of claim 1, wherein the first conductor has a phase angle of 45 degrees at a known approximate frequency, and the selected frequency of the circuit is equal to the known approximate frequency.

4. The cable of claim 1, wherein the network further comprises a plurality of circuits each said circuit comprising:
   a resistive element electrically coupled in series with a capacitive element, said capacitive element and resistive element having values such that the phase angle of the circuit is approximately −45 degrees at a selected frequency within the audio frequency range and such that the measured impedance of the circuits when connected in parallel, at all frequencies in the predetermined frequency range is equal to or greater than 0.20 MΩ,
wherein each said circuit is electrically coupled between the first conductor and the second conductor.

5. The cable of claim 4, wherein the first conductor has a phase angle of 45 degrees at a known approximate frequency, and the capacitive elements and the resistive elements of each of the plurality of circuits have values such that the selected frequency of each circuit is not equal to the known approximate frequency.

6. The cable of claim 4, wherein the first conductor has a phase angle of 45 degrees at a known approximate frequency, and the selected frequency of at least one of the circuits is equal to the known approximate frequency.

7. The cable of claim 5, wherein the selected frequency of each of the circuits is not equal to the selected frequency of any of the other circuits.

8. The cable of claim 7, wherein the selected frequencies of the plurality of circuits are approximately equally distributed on a logarithmic scale within a selected frequency range, said selected frequency range being in the audio frequency range.

9. The cable of claim 1, wherein the source is an electrical musical instrument.

10. The cable of claim 1, wherein the circuit further comprises an inductive element electrically coupled to the capacitive element such that said inductive element, capacitive element and resistive element are connected in series, said capacitive element, inductive element and resistive element having values such that the phase angle of the circuit is approximately −45 degrees at a selected frequency within the audio frequency range.

11. The cable of claim 10, wherein the first conductor has a phase angle of 45 degrees at a known approximate frequency, and the selected frequency of the circuit is not equal to the known approximate frequency.

12. The cable of claim 10, wherein the first conductor has a phase angle of 45 degrees at a known approximate frequency, and the selected frequency of the circuit is equal to the known approximate frequency.

13. The cable of claim 10, wherein the source is an electrical musical instrument.

14. A method for modifying the audio output of a system comprising a cable, said cable comprising a first conductor and a ground, a source of electrical signals, and an amplifier, said method comprising the steps of:

determining the approximate frequency at which the phase angle of the first conductor is equal to 45 degrees;

determining the inherent capacitance of the cable;

selecting a network comprising a resistive element and a capacitive element electrically couples in series, such that the phase angle of the network is equal to −45 degrees at the target frequency, and the measured impedance of the network at all frequencies in a predetermined frequency range is equal to or greater that 0.20 MΩ, and the combined capacitance of the capacitive element and the inherent capacitance of the cable is less than 2500 pF;

electrically connecting the network between the first conductor and the ground; and connecting the cable between the source and the amplifier.

* * * * *